United States Patent [19]

Krinski et al.

[11] 4,352,692

[45] Oct. 5, 1982

[54] MODIFIED VEGETABLE PROTEIN ADHESIVE BINDER

[75] Inventors: Thomas L. Krinski, Granite City, Ill.; Carroll L. Garey, St. Louis, Mo.

[73] Assignee: Ralston Purina Company, St. Louis, Mo.

[21] Appl. No.: 244,439

[22] Filed: Mar. 16, 1981

[51] Int. Cl.$^3$ ............................ C09D 1/04; C09D 3/02
[52] U.S. Cl. ........................................................ 106/79
[58] Field of Search ............ 106/124, 149, 153, 154 R, 106/154 Z, 137, 161, 125, 79; 260/123.5

[56] References Cited

U.S. PATENT DOCUMENTS

| | | | |
|---|---|---|---|
| 845,791 | 3/1907 | Isaacs | 106/153 |
| 2,234,183 | 3/1941 | Lofgren | 106/79 |
| 2,246,466 | 6/1941 | Julian et al. | 260/123.5 |
| 2,274,983 | 3/1942 | Hieronymus | 106/154 R |
| 2,284,800 | 6/1942 | Close | 106/153 |
| 3,356,516 | 12/1967 | Schwalbe | 106/146 |
| 3,392,038 | 7/1968 | Teyral | 106/154 R |
| 3,436,300 | 4/1969 | Bryner | 106/154 R |

*Primary Examiner*—Robert A. Yoncoskie
*Attorney, Agent, or Firm*—Virgil B. Hill

[57] ABSTRACT

A modified vegetable protein adhesive binder and process for its production is disclosed comprising; forming a slurry of a urease containing vegetable protein material having a proteinaceous solids content of 10 to 30% by weight and including in said slurry a quantity of water soluble silicate to minimize foaming during reaction of the protein material. Urea is then added which reacts with the urease to liberate ammonia from the urea and raise the pH of the slurry to above about 8. The slurry having an alkaline pH is reacted with an oxidizing agent to modify the protein, followed by heating of the modified protein at a temperature of 220–320° F. The modified protein material is then cooled and dried to result in a protein adhesive binder with excellent rheological properties and good coating characteristics.

34 Claims, No Drawings

MODIFIED VEGETABLE PROTEIN ADHESIVE BINDER

BACKGROUND OF THE INVENTION

This invention relates to a modified vegetable protein adhesive binder and a process for producing the same.

Vegetable protein materials are well-known as adhesive binders for pigment containing coatings that are used for the coating of paper. The pigment containing coatings provide the paper with a desirable finish, gloss, and smoothness. The functions of the pigment in the coating are to fill in the irregularities of the paper surface and to produce an even and uniformly absorbant surface for printing. The adhesive also functions to bind the pigment particles to each other as well as to the surface of the coating. The selection of a suitable adhesive is, therefore, an important factor in the quality of a coating for paper.

Vegetable protein materials have been extensively used as the adhesive binders for paper coatings and among these materials have been the vegetable protein isolates, typically soy isolate. Isolated soy protein is produced by the treatment of oil free soybean flakes with an alkaline solution to dissolve the protein which is removed from the non-soluble materials by filtration or centrifugation. The protein is then recovered from the solution by the addition of acid in order to precipitate the protein at its isoelectric point. The precipitated protein is then in an unhydrolyzed or generally unmodified state and can be dried and subsequently dispersed in an alkaline medium to form an adhesive binder for paper coating pigments.

The unhydrolyzed or unmodified soy protein isolates are less desirable as adhesive binders for paper coatings because of low solubility in weak alkali solutions and sensitivity to heat, tending to form gels at temperatures of about 160° F. Because of these disadvantages, unmodified or non-hydrolyzed soy protein is usually modified in some way to lower the viscosity of coating compositions containing soy protein and increase the adhesive strength of the protein when it is dispersed in weak alkaline solutions. Modification or hydrolysis of the protein also reduces the sensitivity of the protein to heat. Modification of the protein usually consists of hydrolysis or treatment of the extracted curd in an aqueous dispersion with various alkaline reagents under controlled conditions of pH, temperature and time. These conditions dissociate the native or unmodified protein structure into smaller subunits thereby improving the suitability of this material as a binder in paper coatings. A process involving the hydrolysis of soy protein with an alkaline reagent in a jet cooker at temperatures above 270° F. is illustrated in U.S. Pat. No. 3,356,516.

Another means of modifying the protein which is described in U.S. Pat. No. 2,274,983 is to treat the unmodified protein with hydrogen peroxide in a mildly alkaline medium in order to produce a modified or oxidized protein which has a much lower viscosity. Treatment of isolated soy protein with sodium peroxide is also taught in U.S. Pat. No. 2,246,466 in order to improve the color, adhesion, viscosity and gelling tendency of vegetable protein adhesive binders. Either of the processes described in these patents describe the treatment of the protein with peroxide in an alkaline medium followed by precipitation of the modified protein material at the isoelectric point of the protein.

U.S. Pat. No. 3,411,925 describes the treatment of a protein and starch composition at an alkaline pH of 8–10 with an oxidizing agent followed by jet cooking of the composition at a temperature of 220°–350° F. It is indicated that this process results in grafting of the starch and protein molecules to modify the viscosity characteristics of the composition and improve its usefulness as an adhesive binder in paper coating compositions.

Modification of vegetable protein isolates, such as soy isolate as generally described above, alters rheological properties of these protein materials such that they are similar to but not identical with casein, which has also long been used as an adhesive binder for pigment containing coatings for paper. In spite of these attempts at modification of isolated soy protein, particularly by oxidation, a need has still existed for modified proteinaceous adhesives which have rheological properties comparable or better than casein and can be modified by an oxidizing agent in a manner which is efficient and convenient to perform. Typical problems with carrying out the mild oxidation of protein in an alkaline medium include difficulties with pH regulation during the oxidation and uncontrollable foaming of the reaction mixture. For example, it is necessary that pH modification be carried out under alkaline conditions and the pH of the reaction mixture is constantly dropping as reactant is consumed thereby requiring continual adjustment of the pH to keep the reaction mixture on the alkaline side.

These objectives were achieved in the present invention and not only were the noted problems with modification of the protein material overcome, but the reaction resulted in a modified proteinaceous adhesive binder having an unexpected improvement in rheological and paper coating properties.

It is, therefore, an object of the present invention to produce a modified proteinaceous adhesive binder of good rheological properties.

It is also an object of the present invention to produce a modified vegetable protein adhesive binder having rheological characteristics which are similar to casein.

It is a further object to produce a modified vegetable protein adhesive binder with good pigment binding and paper coating characteristics.

It is a further object to modify the vegetable protein adhesive binder by a process that is both reliable and convenient to practice.

SUMMARY OF THE INVENTION

These and other objects are achieved in the present invention by a modified vegetable protein adhesive binder having good rheological and paper coating characteristics and the process for its production described hereafter. The process for forming the modified vegetable protein adhesive binder of the present invention comprises forming an aqueous slurry of a urease containing vegetable protein material, especially soy protein, having a proteinaceous solids content of between about 10 to 30% by weight. A water soluble silicate is then added to the slurry to minimize foaming of the reaction mixture during oxidation of the protein and additionally a sufficient quantity of urea is also introduced into the slurry which reacts with the urease present in the vegetable protein to thereby yield free ammonia and adjust the pH of the slurry to above about 8. This quantity of urea not only provides the necessary pH for the oxidation reaction but the constant reaction between the urease and urea releases ammonia to maintain this pH throughout the period of reaction including the heating step, thereby avoiding the necessity of continually adjusting the pH of the reaction mixture. The slurry of proteinaceous material with added urea and silicate is then reacted with an oxidizing agent in order to modify the proteinaceous material and alter the rheological characteristics thereof. Following modification of the proteinaceous slurry, this slurry is then treated by heating to an elevated temperature of between about 220° to 320° F. preferably for a period of time of between about 90–150 seconds followed by cooling and drying of the slurry.

The modified proteinaceous material produced by the above general process results in a dried material having a pH of about 7 and having excellent rheological characteristics in aqueous mediums therefore making it highly suitable as a pigment binder in paper coating compositions. Coating compositions prepared with the modified proteinaceous adhesive of the present invention have improved rheological properties when applied to paper thereby permitting the application of a higher level of solids in the coating without undesirable alteration of the appearance of the paper. A higher level of solids in the coating is also desirable in order to reduce the amount of water in the coating and therefore the drying time of the coated paper.

DESCRIPTION OF THE PREFERRED EMBODIMENTS

The present invention applies to a vegetable protein material, specifically to a vegetable protein isolate and preferably to soy isolate. The present invention is therefore, described with regard to a soy isolate since this is the primary area of concern for which the present invention was developed although it is apparent that other vegetable protein or soy materials can be employed. An isolated soy protein is prepared by treatment of defatted soybean flakes with an alkaline solution to solubilize the protein. The protein is then separated from the alkali insoluble solids by filtration or centrifugation. The proteinaceous solution is subsequently precipitated in the form of a curd by adjustment of the pH of the solution to the isoelectric point of the protein or usually between about 4 to 4.5 in the case of soy protein. The curd can be dried to produce a granulated dried protein of greater than 95% purity. In the context of the present invention, the curd without further processing may be utilized in the modification reaction which is hereafter described. It is not intended to limit the present invention to only the curd as opposed to a dried protein material. Typically, soy isolate which has been produced according to the above technique, and which has not otherwise been heated or modified in some fashion will contain a significant amount of urease, which is an inherent component of uncooked or unmodified soy protein. It is however, not intended to limit the present invention only to unmodified protein isolate since it is apparent that urease may also be added to the protein material to react with the added urea as described below. The unmodified or acid precipitated protein is then formed into an aqueous slurry having a proteinaceous solids content of between about 10 to 30% by weight and preferably between about 10 to 20% by weight. Usually, the acid precipitated protein will have a pH of between 4 and 4.5, although higher or lower pH's may also be used. To the slurry of soy protein isolate is added a water soluble silicate which minimizes foaming of the reaction mixture during the oxidation reaction. The preferred amount of silicate is between about 5 to 15% by weight of the proteinaceous solids content. Although a variety of water soluble silicates are suitable for use in the present invention and the present invention is not intended to be limited by the specific type that may be employed, it is preferred that an alkali silicate such as sodium silicate be employed since such this material is highly soluble and readily available.

A quantity of urea is then added to the proteinaceous slurry containing the water soluble silicate and this becomes a significant additive relative to the production of the modified proteinaceous adhesive of the present invention. In this regard, the unmodified soy protein material generally produced as set forth above, contains a significant quantity of urease which reacts with the added urea resulting in the liberation of ammonia from the urea and increasing the pH of the slurry to at least about 8 and preferably between about 8 and 10. It is not intended to limit the present invention only to unmodified or uncooked protein materials, since it is apparent that urease can also be added to the reaction mixture if necessary to liberate ammonia from the urea even if a significant amount is not inherently present in the protein material. Normally, the amount of urea that will be added will be that which is sufficient to provide a pH for the slurry within the noted range. The urea provides a means of controlling the alkalinity of the reaction mixture on a continuing basis during the oxidation reaction without constant adjustment of the pH. Preferably, the amount of urea that is employed is between about 1 to 5% by weight of the proteinaceous solids content of the slurry.

A modifying or oxidizing amount of an oxidizing agent is then added to the proteinaceous slurry containing the soluble silicate and urea in order to react with and otherwise modify the proteinaceous material thereby altering the molecular characteristics of the native unmodified soy protein. The preferred oxidizing agent employed in the present invention is a peroxide, preferably a soluble peroxide such as hydrogen peroxide, sodium peroxide, barium or magnesium peroxide. Other oxidizing agents such as the hypochlorites or perborates may also be used and the specific type of oxidizing agent used is not critical to the present invention. Typical amounts of the oxidizing agent necessary to modify the proteinaceous material are between about 5 to 15% by weight of the proteinaceous solids content and preferably between about 8–12% by weight of the proteinaceous solids content of the slurry. The modification or oxidation reaction is allowed to proceed for a period of time sufficient to alter the rheological characteristics of the protein by modification of the soy protein molecule. Typically, oxidation reactions of the above type result in a modified protein which has a lower viscosity than the native or unmodified protein. This is the case with the present invention and the oxidation reaction is allowed to proceed for a period of time sufficient to modify the protein or otherwise lower the viscosity thereof. During the oxidation reaction as described above, the presence of the urea in the reaction mixture and urease from the native soy protein, controls the pH of the reaction mixture to above about 8, thereby increasing the effectiveness of the peroxide as an oxidizing agent and results in a modification of the soy protein molecule in a manner which is far superior and more efficient than the prior art. Furthermore, the presence of the water soluble silicate in the reaction mixture inhibits the formation of foam which is a common problem in modification or oxidation reactions of the above type, thereby making the process of the present invention very suitable to be carried out on a commercial basis.

Following the oxidation reaction, the oxidized or modified soy protein material is then subjected to instantaneous heating or a high temperature heat treatment for a short period of time. It is preferred, therefore, that heating be carried out by a jet cooker or similar device which employs the direct injection of high pressure or high velocity steam directly into the slurry since in this fashion instantaneous heating or the desired temperatures can be achieved in the shortest possible time. Therefore, heating of the modified proteinaceous slurry is preferably carried out by the use of a jet cooker or similar device which relies upon the injection of high velocity steam at greater than atmospheric pressures into a stream of the modified proteinaceous material. It is, therefore, preferred for purposes of the present invention that such heating, typically by direct steam injection be carried out at a temperature of between about 220°–320° F. preferably for a time of between about 90–150 seconds.

As previously noted, the modified soy protein material of the present invention not only has very desirable rheological characteristics having a viscosity in an alkaline solution of 300–600 cps, but furthermore, provides an unexpected improvement in the coating properties of pigment containing paper coating compositions. This improvement lies not only in the ease and manner in which such a composition can be formed, but in the color of the paper coated with the pigment compositions containing the binder of the present invention. Coating compositions containing the modified proteinaceous adhesive binder of the present invention have excellent adhesive strength and are comparable in color to casein coatings yet better than the soy protein coatings of the prior art. This permits the application of coatings containing a much higher solids level than would normally be possible.

Following instantaneous heating or jet cooking of the modified proteinaceous slurry, the slurry is cooled preferably to a temperature of between about 120° to 200° F. followed by dewatering thereof. The modified proteinaceous material at this point typically has a pH of at least about 7 and usually between about 6.5 to 7.5. The modified proteinaceous adhesive binder may then be used in alkali pigment containing paper coating compositions as an adhesive binder and results in coating compositions having very desirable rheological and coating characteristics. It is also significant in the present invention to note that the modified proteinaceous binder of the present invention following the oxidation reaction and heating thereof is not acid precipitated as is the case with other modified protein binders in the prior art. It is believed that the omission of the acid precipitation step and drying of the slurry at a pH of 7 or above further results in a modified proteinaceous binder which contains all of the molecular fragments obtained by the modification or oxidation reaction rather than discarding a certain fraction of these as would be done in subsequent solubilization and precipitation of the protein at the isoelectric point. It is, thereby, believed that avoidance of the subsequent acid precipitation of the protein further improves the functionality of the proteinaceous adhesive binder of the present invention in paper coating compositions.

The following Examples will represent specific but non-limiting embodiments of the present invention and are also intended to show the improved properties of paper coating compositions containing the modified proteinaceous adhesive binder of the present invention.

EXAMPLE 1

245 lbs. of acid precipitated soy protein isolate having a pH of about 4.5 was formed into an aqueous slurry by the addition of 155 lbs. of 90° F. water until a proteinaceous solids content of 15% was achieved. To the slurry was added 5% by weight of the solids of sodium silicate, and 4% by weight of the solids of urea, and 10% by weight of the solids of Hydrogen Peroxide. The slurry containing these three materials was allowed to stand for 15 minutes and the pH was determined to be 8.75.

The slurry was then heated in a jet cooker operated at a back pressure of 90 psi to a temperature of 320° F. for 120 seconds. The heated product was then discharged into a vacuum chamber held at 20 inches of Mercury in order to cool the product to a temperature of 160° F. The product is then fed into a spray drier and dried at an exhaust temperature of 220° F. The dried product has a pH of about 7.8.

The dried product was then formed into a solution with water at 25° C. and 15% solids which was adjusted to a pH of 9.5 with Ammonium Hydroxide and cooked for 30 minutes at 60° C. The viscosity of the cooked solution was then measured at 60 r.p.m. with a LVT Brookfield Viscometer and #2 spindle. The viscosity was measured as 560 centipoise, which represents excellent rheological characteristics for a soy protein isolate with a viscosity comparable to casein. The product will, therefore, perform well as an adhesive binder in a paper coating.

EXAMPLE 2

163 lbs. of acid precipitated soy protein isolate having a pH of about 4.5 was formed into an aqueous slurry having a proteinaceous solids content of 15% by the addition of 87 lbs. of water at a temperature of 80° F. To the slurry was added 5% by weight of the solids of sodium silicate, 2% by weight of the solids of urea and 10% by weight of the solids of Hydrogen Peroxide. The slurry containing these materials was allowed to stand for 15 minutes and the pH of the slurry was measured as 7.8.

The slurry was then heated in a jet cooker operated at a back pressure of 90 psi at a temperature of 320° F. for 120 seconds. The heated product was then discharged into a vacuum chamber held at 20 inches of Mercury in order to cool the product to a temperature of 160° F. The product was then fed into a spray drier and dried at an exhaust temperature of 220° F. The dried product has a pH of 6.8.

To evaluate the slurry characteristics of the modified protein adhesive binder of the present invention and as an adhesive binder for pigment containing paper coatings, the following tests were conducted on the products set forth below.

The product of the present invention was compared to several other prior art products by forming solutions of these products at 15% solids. The solution pH was adjusted to 9.5 by the addition of Ammonium Hydroxide and cooked for 30 minutes at 60° C. The viscosity of these cooked solutions was then measured on a Brookfield Viscometer, Model #LVT with a #2 spindle at 60 r.p.m. and the color of the solutions was compared by using a Hunter Lab Colorimeter and comparative readings on a "L", "a", and "b" scale. The "L" scale represents the brightness of the color, the "a" scale the red-green, and the "b" the yellow-blue. The results of these measurements are set forth in Table 1 below.

TABLE 1

| Sample | Viscosity (centipoise) | Color L | a | b |
|---|---|---|---|---|
| Casein | 1380 | 40.6 | −2.3 | −1.3 |
| Modified Soy Isolate Produced by Example 3 | 560 | 38.7 | −0.7 | +14.8 |
| Hydrolyzed Soy Protein Isolate | 34 | 19.5 | −1.9 | +6.1 |

It may be seen that the viscosity of the solution of the modified protein isolate of the present invention was closer to casein than a conventional modified or hydrolyzed isolate hydrolyzed by the addition of alkali and cooking at an alkaline pH. The brightness of the solution as represented by the "L" scale, was also closer to that of casein than the unmodified material.

The performance of the modified protein isolate of the present invention as an adhesive binder for paper coatings as compared to the above products was evaluated by preparation of the following coating.

Paper Coating (50% Total Solids)
100 parts of clay on a dry basis was supplied by a slurry containing 70% by weight of clay. This was combined with 15 parts of a protein isolate on a dry basis which was supplied by a protein solution with a solids level on an oven dry basis of 17% by weight.

The coating was adjusted to a pH of 9.0 by the addition of Ammonium Hydroxide and evaluated for viscosity on a Brookfield Viscometer with an RVT meter and a #6 spindle as set forth in Table 2 and applied to paper with a draw down bar. About 14–15 gm/m² of coating was applied to each sheet of paper. The coated paper was then evaluated for gloss by method T-480, opacity by method T-425, and brightness by method T-452, these being standard methods of measurement by the Technical Association of Pulp and Paper Industries (TAPPI). These results are also set forth in Table 2.

TABLE 2

| Product | Coating Viscosity (CPS) 10 RPM | 100 RPM | % Brightness | % Gloss | % Opacity |
|---|---|---|---|---|---|
| Casein | 32,000 | 9,200 | 76.3 | 59.1 | 96.3 |
| Modified Soy Isolate Produced by Example 3 | 13,000 | 3,400 | 75.4 | 63.9 | 96.7 |
| Hydrolyzed Soy Protein Isolate | 10,600 | 2,480 | 74.4 | 64.3 | 96.2 |

It may be seen that the coating viscosity was lower with the modified isolate of the present invention than casein while the paper coatings were comparable in brightness, gloss and opacity to casein. This lower viscosity is a significant improvement since it permits the use of a much higher solids level in the coating as compared to casein.

EXAMPLE 3

To illustrate the importance of the use of the urea and silicate in modification of the protein isolate of the present invention and the unexpected improvement in coating properties of coatings prepared with this material as an adhesive binder, the following comparison was made.

A modified protein isolate produced by the process as set forth in Example 2 was compared to a protein isolate produced by a process which comprised the following.

Procedure A—acid precipitated soy isolate having a pH of 4.5 was adjusted to a solids level of 10% by weight. The pH of the slurry was adjusted to 8.0 by the addition of Sodium Hydroxide. 10% by weight of the solids of the slurry of Hydrogen Peroxide was added. The slurry was initially preheated for 30 minutes as 160° F. and then passed through a jet cooker operated at a backpressure of 90 psi, at a temperature of 320° F. for 2 minutes. The heated product was then discharged into a vacuum chamber held at 20 inches of Mercury in order to cool the product to a temperature of 160° F. The product was then fed into a spray drier and dried at an exhaust temperature of 220° F.

Paper coatings were prepared according to the procedure set forth in Example 2 with both the material obtained by Procedure A set forth above and according to the present invention as generally described in Example 2. Evaluation of the coatings were made as described in Example 2 and these are set forth in Table 3. An additional evaluation of adhesive strength was also made as described in TAPPI procedure T-499.

TABLE 3

| Product | Coating Viscosity (CPS) 10 RPM | 20 RPM | 50 RPM | 100 RPM | pH | Coating Wt. G/M² | % Gloss | % Opacity | % Brightness | IGT #5 ink cm/sec. |
|---|---|---|---|---|---|---|---|---|---|---|
| Produced by Procedure A | 6,000 | 3,625 | 2,100 | 1,375 | 9.8 | 14.09 | 65.6 | 96.3 | 75.2 | 136 |
| Product according to Present Invention | 13,500 | 9,000 | 5,200 | 3,400 | 9.7 | 15.01 | 63.9 | 96.8 | 75.4 | 160 |

The modification reaction carried out in the presence of the silicate had minimal foaming, compared to the process set forth in Procedure A. The IGT value set forth in Table 3 measures the surface strength of the coated paper by measuring the force that the coating will withstand with certain types of ink using in letterpress printing. It is apparent that the use of the urea and silicate in modification of the protein not only overcomes the problems of foaming and pH control but results in an unexpected improvement in adhesive strength of paper coatings prepared with the modified protein from Procedure A as the adhesive binder.

While the present invention has been described with regard to the specific embodiments set forth above, it should be understood that it is intended to include within the scope of the present invention all reasonable or equivalent variations thereof.

What is claimed is:

1. A process for the production of a modified vegetable protein adhesive binder comprising:
   a. forming a slurry of a urease containing vegetable protein material having a proteinaceous solids content of 10 to 30% by weight;
   b. adding to said slurry a water soluble silicate in amounts effective to reduce foaming during reaction of the protein material and sufficient urea to react with the urease and provide a pH for the slurry above about 8, and
   c. reacting said slurry with an oxidizing agent in an amount and for a time sufficient to improve the rheological properties by lowering the viscosity of the protein material.

2. The process of claim 1 wherein said slurry has a proteinaceous solids content of 10 to 20% by weight.

3. The process of claim 1 wherein said slurry prior to addition of the silicate and urea has a pH of between about 4–4.5.

4. The process of claim 1 wherein said water soluble silicate is present in an amount of about 5 to 15% by weight of the proteinaceous solids of said slurry.

5. The process of claim 1 wherein said water soluble silicate is an alkali silicate.

6. The process of claim 5 wherein said alkali silicate is sodium silicate.

7. The process of claim 1 wherein sufficient urea is added to react with the urease and provide a pH for the slurry of between about 8–9.

8. The process of claim 1 wherein said oxidizing agent is a peroxide.

9. The process of claim 8 wherein said oxidizing agent is selected from the group consisting of Hydrogen Peroxide and Sodium Peroxide.

10. The process of claim 1 wherein the amount of oxidizing agent is between about 8–12% by weight of the solids content of said slurry.

11. The process of claim 1 wherein said vegetable protein material is a soy material.

12. The process of claim 11 wherein said soy material is an isolated soy protein material.

13. A process for the production of a modified vegetable protein alkaline binder comprising:
   a. forming a slurry of a urease containing vegetable protein material having a proteinaceous solids content of 10 to 30% by weight;
   b. adding to said slurry a water soluble silicate in amounts effective to reduce foaming during reaction of the protein material and sufficient urea to react with the urease and provide a pH for the slurry above about 8,
   c. reacting said slurry with an oxidizing agent in an amount and for a time sufficient to improve the rheological properties by lowering the viscosity of the protein material;
   d. heating said reacted slurry to a temperature of between about 220° to 320° F. for between about 90–150 seconds.

14. The process of claim 13 wherein said slurry has a proteinaceous solids content of 10 to 20% by weight.

15. The process of claim 13 wherein said slurry prior to addition of the silicate and urea has a pH of between about 4–4.5.

16. The process of claim 13 wherein said water soluble silicate is present in an amount of about 5 to 15% by weight of the proteinaceous solids of said slurry.

17. The process of claim 13 wherein said water soluble silicate is an alkali silicate.

18. The process of claim 17 wherein said alkali silicate is sodium silicate.

19. The process of claim 13 wherein sufficient urea is added to react with the urease and provide a pH for the slurry of between about 8 to 9.

20. The process of claim 13 wherein said oxidizing agent is a peroxide.

21. The process of claim 20 wherein said oxidizing agent is selected from the group consisting of hydrogen peroxide and sodium peroxide.

22. The process of claim 13 wherein the amount of oxidizing agent is between about 8 to 12% by weight of the solids content of said slurry.

23. The process of claim 13 wherein said vegetable protein material is a soy material.

24. The process of claim 23 wherein said soy material is an isolated soy protein material.

25. A process for the production of a modified vegetable protein adhesive binder comprising:
   a. forming a slurry of a urease containing vegetable protein material having a proteinaceous solids content of 10 to 30% by weight;
   b. adding to said slurry a water soluble silicate in amounts effective to reduce foaming during reaction of the protein material and sufficient urea to react with the urease and provide a pH for the slurry of above about 8;
   c. reacting said slurry with an oxidizing agent in an amount and for a time sufficient to improve the rheological properties by lowering the viscosity of the protein material,
   d. heating said reacted slurry to a temperature of between about 220° to 320° F. for between about 90–150 seconds; and
   e. dewatering said heated slurry to provide a dried vegetable protein adhesive binder.

26. The process of claim 25 wherein said dried vegetable protein adhesive binder has a pH of about 7.

27. The process of claim 25 wherein said slurry has a proteinaceous solids content of 10 to 20% by weight.

28. The process of claim 25 wherein said water soluble silicate is present in an amount of about 5 to 15% by weight of the proteinaceous solids of said slurry.

29. The process of claim 28 wherein said alkali silicate is sodium silicate.

30. The process of claim 25 wherein sufficient urea is added to react with the urease and provide a pH for the slurry of between about 8 and 9.

31. The process of claim 25 wherein said oxidizing agent is selected from the group consisting of hydrogen peroxide and sodium peroxide.

32. The process of claim 25 wherein the amount of oxidizing agent is between about 8 to 12% by weight of the solids content of said slurry.

33. The process of claim 25 wherein said vegetable protein material is an isolated soy protein material.

34. A process for the production of a modified isolated soy protein adhesive binder comprising;

a. forming a slurry of urease containing isolated soy protein material having a proteinaceous solids content of 10 to 30% by weight;
b. adding to said slurry an alkali silicate in an amount of 5 to 15% by weight of the solids to reduce foaming during reaction of the protein material and 1 to 5% by weight of the solids of urea to react with the urease and to provide a pH for the slurry of above about 8;
c. reacting said slurry with a peroxide in an amount of between about 5 to 15% by weight of the protein solids for a time effective to improve the rheological properties by lowering the viscosity of the protein;
d. heating said reacted slurry to a temperature of between about 220° to 320° F. to between about 90–150 seconds; and
e. dewatering said slurry to provide a dried isolated soy protein adhesive binder having a pH of about 7.

* * * * *